(12) United States Patent
Garvey

(10) Patent No.: US 6,925,635 B2
(45) Date of Patent: Aug. 2, 2005

(54) EMBEDDED PRE-PROCESSOR WITH DYNAMIC MACRO FORMS

(75) Inventor: Joseph F. Garvey, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 585 days.

(21) Appl. No.: 10/022,969

(22) Filed: Dec. 13, 2001

(65) Prior Publication Data

US 2003/0115574 A1 Jun. 19, 2003

(51) Int. Cl.[7] .............................................. G06F 9/45
(52) U.S. Cl. ..................... 717/143; 717/142; 717/154
(58) Field of Search ................................. 717/136, 139, 717/137, 123, 141, 114, 143, 154; 700/201

(56) References Cited

U.S. PATENT DOCUMENTS

| | | | | |
|---|---|---|---|---|
| 5,768,564 A | * | 6/1998 | Andrews et al. | ............. 717/137 |
| 6,715,141 B1 | * | 3/2004 | Hodge | ......................... 717/139 |
| 2002/0016639 A1 | * | 2/2002 | Smith et al. | .................... 700/9 |
| 2002/0129341 A1 | * | 9/2002 | Hibdon | ........................ 717/136 |

OTHER PUBLICATIONS

Assembler Compiler Facility for Integrated User Written Preprocessor, IBM Technical Disclosure Bulletin, Jan. 1974, pp. 2614–2615.

* cited by examiner

Primary Examiner—Antony Nguyen-Ba
Assistant Examiner—Chih-Ching Chow
(74) Attorney, Agent, or Firm—Joscelyn G. Cockburn; Dillon & Yudell LLP

(57) ABSTRACT

An embedded pre-processor having dynamic macro types is disclosed. After a lexer receives an identifier token from source code, the lexer compares the identifier token with the macro names stored in the symbol table. If the identifier token matches a macro name stored in the symbol table, the lexer replaces the identifier token with a macro form token. The lexer then sends the macro form token to a glue routine. The glue routine invokes a macro invocation parser. The lexer continues to transfer tokens to the macro invocation parser via the glue routine until the completion of the macro invocation. The macro invocation parser subsequently sends a macro body definition of the macro to the lexer.

10 Claims, 5 Drawing Sheets

US 6,925,635 B2

EMBEDDED PRE-PROCESSOR WITH DYNAMIC MACRO FORMS

BACKGROUND OF THE INVENTION

1. Technical Field

The present invention relates to assembly language programming in general, and in particular to a pre-processor for processing assembly language source code. Still more particularly, the present invention relates to an embedded pre-processor with dynamic macro forms.

2. Description of the Related Art

For a pre-processor to work well with an assembler, the pre-processor has to be able to mimic most, if not all, basic language statements within the assembler. An assembler typically has two basic macro forms, namely, the function call macro form and the opcode macro form. The function call macro form such as func(arga,argb)

resembles a function call that is shared by almost all high-level languages. The opcode macro form such as opcode arg1,arg2 behaves like a function call in many ways, except the arguments are not surrounded by parentheses. Generally speaking, the function call macro form dominates most modern high-level programming languages and the opcode macro form dominates most assembly programming languages.

It is difficult to write a macro language grammar for a grammar that does not surround its function arguments with parentheses. Such difficulty results in most modern pre-processors, typified by C pre-processors and M4 pre-processors, being designed to favor the function call macro form. As such, most modern pre-processors are ill-suited for processing assembly language source code, and any attempt to extend a typical function call style pre-processor to accept the opcode macro form can lead to a very difficult problem. The problem is a macro form must be known before defining the language processing rules for the pre-processor, yet the macro form is not actually determined until the source code is being read by the pre-processor. In other words, a designer designing the pre-processor has to know what form the macro will be, but a programmer does not define the macro until the programmer's source code is being executed by the pre-processor.

For example, without any foreknowledge of the macro form, when the pre-processor encounters a statement like:

foo bar the pre-processor has a terrible problem to solve because the pre-processor does not know whether "foo" is just a macro without arguments or if "foo" takes arguments, and whether "bar" is one or two arguments (e.g., "bar"="Alpha, Beta"). As indicated, the normal procedure to solve such a problem is to have some foreknowledge about "foo" and "bar." However, the programmer defines "foo" and "bar" during the code execution within the pre-processor. Thus, the foreknowledge will have to be acquired at runtime.

To complicate matters even further, a pre-processor for an assembler is commonly "embedded." Unlike a pre-processor for C compilers, which can be run by itself, a pre-processor for an assembler prefers to use the assembler's built-in functions, and shares the same symbol table as the rest of the assembler while the source code is being assembled.

Consequently, it would be desirable to provide an improved embedded pre-processor that is capable of resolving the above-mentioned problem.

SUMMARY OF THE INVENTION

In accordance with a preferred embodiment of the present invention, after a lexer receives an identifier token from source code, the lexer compares the identifier token with the macro names stored in the symbol table. If the identifier token matches a macro name stored in the symbol table, the lexer replaces the identifier token with a macro form token. The lexer then sends the macro form token to a glue routine. The glue routine invokes a macro invocation parser. The lexer continues to transfer tokens to the macro invocation parser via the glue routine until the completion of the macro invocation. The macro invocation parser subsequently sends a macro body definition of the macro to the lexer.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
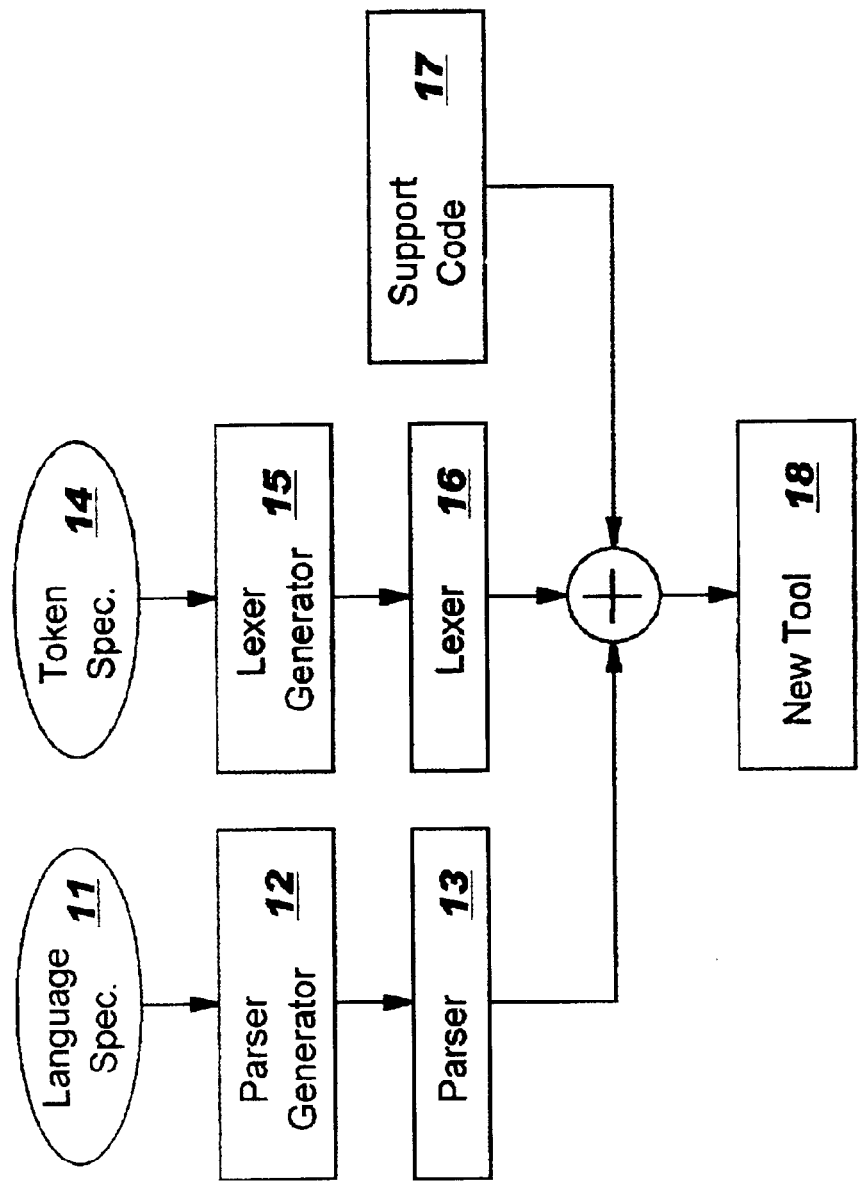
FIG. 1 is a block diagram of an assembler having a parser and a lexer.

The present invention allows a pre-processor to process a variable macro invocation by (1) recognizing that there is only a limited number of possible macro forms, thereby making it possible to code generic grammar rules for each macro form; and (2) dynamically associating a macro form with a macro definition during assembler execution instead of when the assembler is being built.

In order to describe the present invention, some background is required. First, there are only four different possible types of macro invocation, and each type is associated with the unique macro forms listed in Table I.

TABLE I

|  | with parentheses | without parentheses |
| --- | --- | --- |
| with Arguments | Type I | Type II |
| without Arguments | Type III | Type IV |

Second, a macro in the present invention is preferably made up of following four parts, and their definitions are as follows:

| | |
|---|---|
| Macro name | An identifier preferably made up of alphanumeric and underscore characters, which uniquely identifies a macro from other macros. |
| Macro body definition | The text that is used to replace a macro when the macro is invoked. |
| Argument list | Zero or more argument names, or identifiers, that should be replaced by the values passed during the macro invocation. This is done by making each argument a macro without arguments, where the macro body comes from the corresponding argument in the macro invocation. |
| Macro form | One of the four macro forms listed in Table I. |

Third, tools that parse/assemble/compile modern programming languages are built around two core components, namely a parser and a lexer. Parsers and lexers are typically state machines. Since the implementation of a parser state machine or a lexer state machine is quite mechanical, parser generators and lexer generators are normally used to generate a parser and a lexer, respectively.

A parser recognizes the syntax/grammar of the language. A parser is typically constructed using a parser generator, such as YACC (for Unix™) or BISON tools that are well-known to those skilled in the art. A parser generator accepts a set of pattern rules made up of token sequences and executes programmer supplied code when a rule is matched. A typical parser rule recognizes an IF-statement, a data definition, or similar grammatical construct. The output of a parser generator is typically a high-level programming language code such as C code.

A lexer recognizes the tokens in the language. A lexer is typically constructed using a lexer generator, such as LEX (for Unix™) or FLEX tools that are well-known to those skilled in the art. A lexer generator accepts regular expressions (patterns of characters) and executes programmer supplied code when a regular expression is matched. The output of a lexer generator is typically a high-level programming language code such as C code. The output of a lexer is tokens. These tokens are typically keywords, punctuation, and identifiers/labels. Most lexer generators have the ability to maintain a stack of input sources, which allow them to "push" a new input source, such as an include file or macro. When all the input source characters have been converted to tokens, the lexer will "pop" the input source and continue with the previous input source until no more input sources remain.

Referring now to the drawings and, in particular, to FIG. 1, there is depicted a block diagram of an assembler having a parser and a lexer. Normally, a language specification 11 is fed into a parser generator 12 that produces code for a parser 13. Similarly, a token specification 14 describing the tokens for the programming language in question is fed into a lexer generator 15 that produces code for a lexer 16. The code from parser 13 and the code from lexer 16 are then compiled and linked with other support code 17 to generate a new tool 18. It is important to note that the rules to process a particular macro form must be part of language specification 11.

Figure 2:
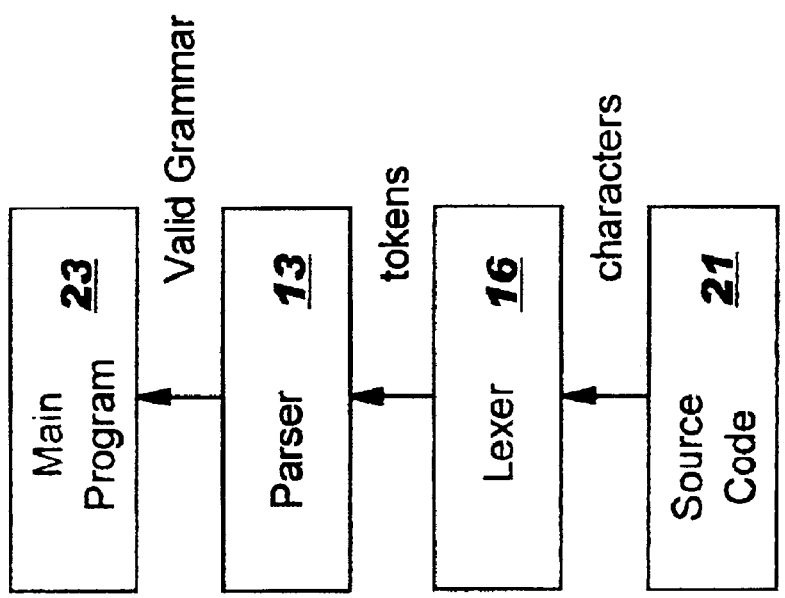
FIG. 2 is a block diagram illustrating the run-time functional relationship between the lexer and the parser from FIG. 1, according to the prior art.

With reference now to FIG. 2, there is depicted a block diagram illustrating the run-time functional relationship between parser 13 and lexer 16, according to the prior art. After reading characters from source code 21, lexer 16 recognizes tokens within source code 21 and sends the tokens to parser 13. Parser 13 then reads the tokens from lexer 16, recognizes a valid grammar, and returns that information to a main program 23.

The process depicted in FIG. 2 becomes more complicated when dealing with an embedded pre-processor. Instead of having a lexer and a parser for each of the two separate tools (i.e., assembler and pre-processor), there is a single lexer and a single parser for both tools. Because any non-keyword identifier could be a macro, there is a combinatorially large number of possibilities for a grammar designer to deal with. Such a large number of possibilities makes a single language specification for integrating a pre-processor language and the underlying language (i.e., assembly language) highly impractical if not impossible.

The present invention provides a method for keeping the grammar for the basic assembly language and the grammar for the macro recognition separate from each other, thereby preventing the explosion of grammatical possibilities. The key part of the present invention occurs in the handling of forms (or tokens) for macros.

Figure 3:
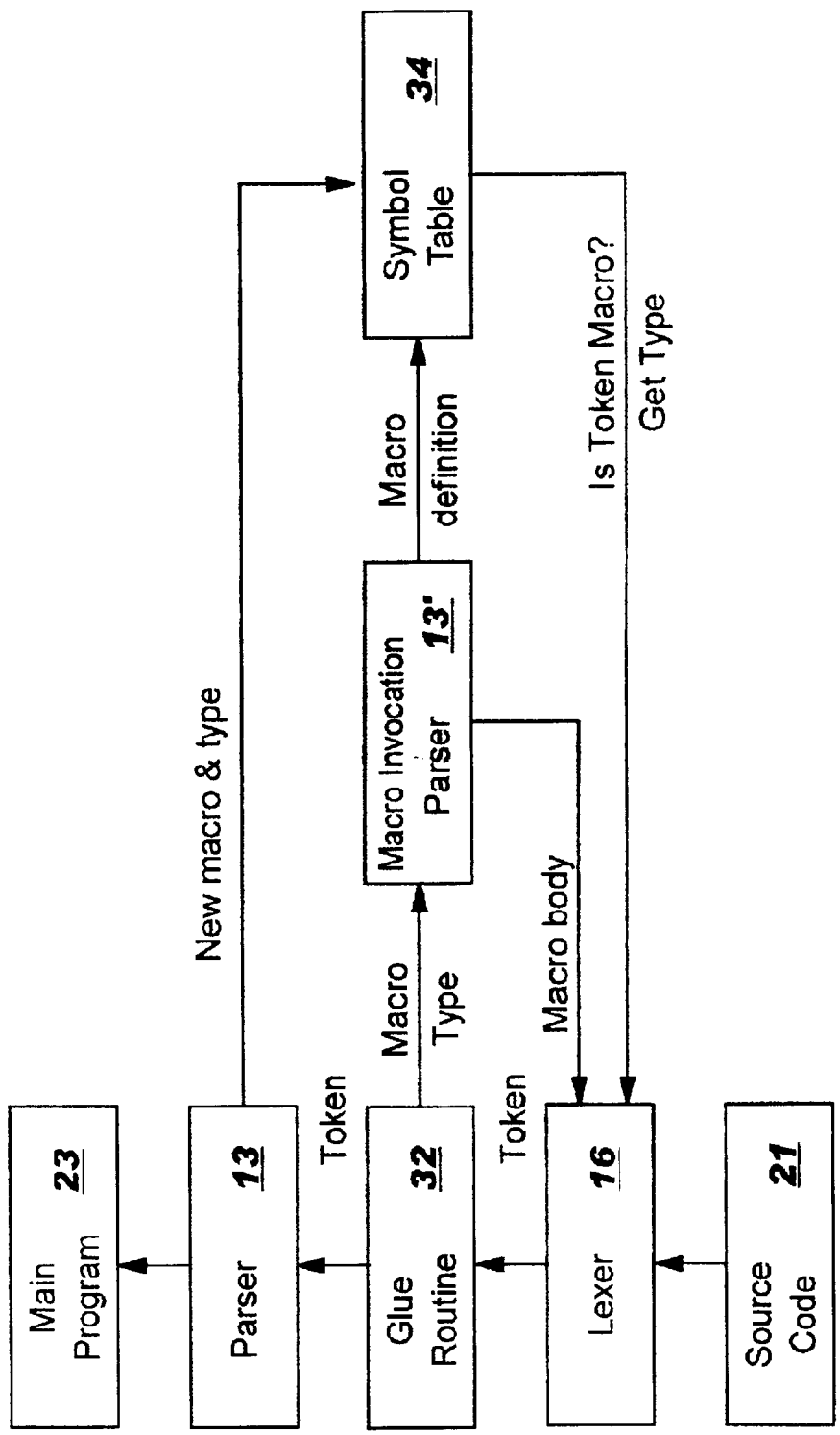
FIG. 3 is a block diagram illustrating the run-time functional relationship between a lexer and a parser from FIG. 1, in accordance with a preferred embodiment of the present invention.

Referring now to FIG. 3, there is depicted a block diagram illustrating the run-time functional relationship between lexer 16 and parser 13, in accordance with a preferred embodiment of the present invention. When reading characters from source code 21, lexer 16 recognizes tokens within source code 21. After an identifier token has been recognized by lexer 16, lexer 16 interrogates a symbol table 34 to determine if the identifier token is a macro name. If the identifier token is determined not to be a macro name, then lexer 16 sends the identifier token to a glue routine 32. Otherwise, if the identifier token is determined to be a macro name, then lexer 16 sends a corresponding macro form token that is stored with a macro name in symbol table 34, instead of the identifier token, to glue routine 32. The sending of the macro form token to glue routine 32 causes the beginning of a macro invocation cycle.

During the macro invocation cycle, glue routine 32 recognizes the macro form token and invokes a macro invocation parser 13' instead of simply passing the token to parser 13. Macro invocation parser 13' then continues to receive (or pull) tokens from glue routine 32 until a full macro invocation is recognized. After a full macro invocation has been recognized, macro invocation parser 13' adds the arguments to the full macro definition to symbol table 34, and the macro body is retrieved from symbol table 31. The macro body is forced onto an input stack of lexer 16. Macro invocation parser 13' then returns to glue routine 32. Since glue routine 32 has no token to send to parser 13, glue routine 32 fetches the next token from lexer 16, which is now reading from the macro body definition sent by macro invocation parser 13'. Such token is then processed as described previously, which means that the token is returned to parser 13 to satisfy the original request for a token.

When a macro invocation cycle is not occurring, glue routine 32 sends the tokens from lexer 16 to parser 13. If parser 13 recognizes a macro definition from the tokens sent by glue routine 32, parser 13 stores the macro definition in symbol table 34, along with a token that is associated with the macro form of the macro definition. The macro form is one of the forms selected from Table I. The macro form token allows a grammar designer to only be concerned with the grammar rules for the different macro forms listed in Table I and not a combinatorially large number of possibilities.

In practice, parser 13 can be made reentrant, and combined with macro invocation parser 13' by adding a top level grammar rule that allows either a macro invocation grammar rule to satisfy parser 13 or a basic assembly language program to satisfy macro invocation parser 13'. This allows a single parser to act like two separate parsers. Glue routine 32 is a subroutine that ends up being recursively called. Such recursion is necessary to support nesting of macro invocation (i.e., macro invocations inside macro invocations). In effect, glue routine 32 acts as a switch routing token to multiple different parsers.

Figure 4:
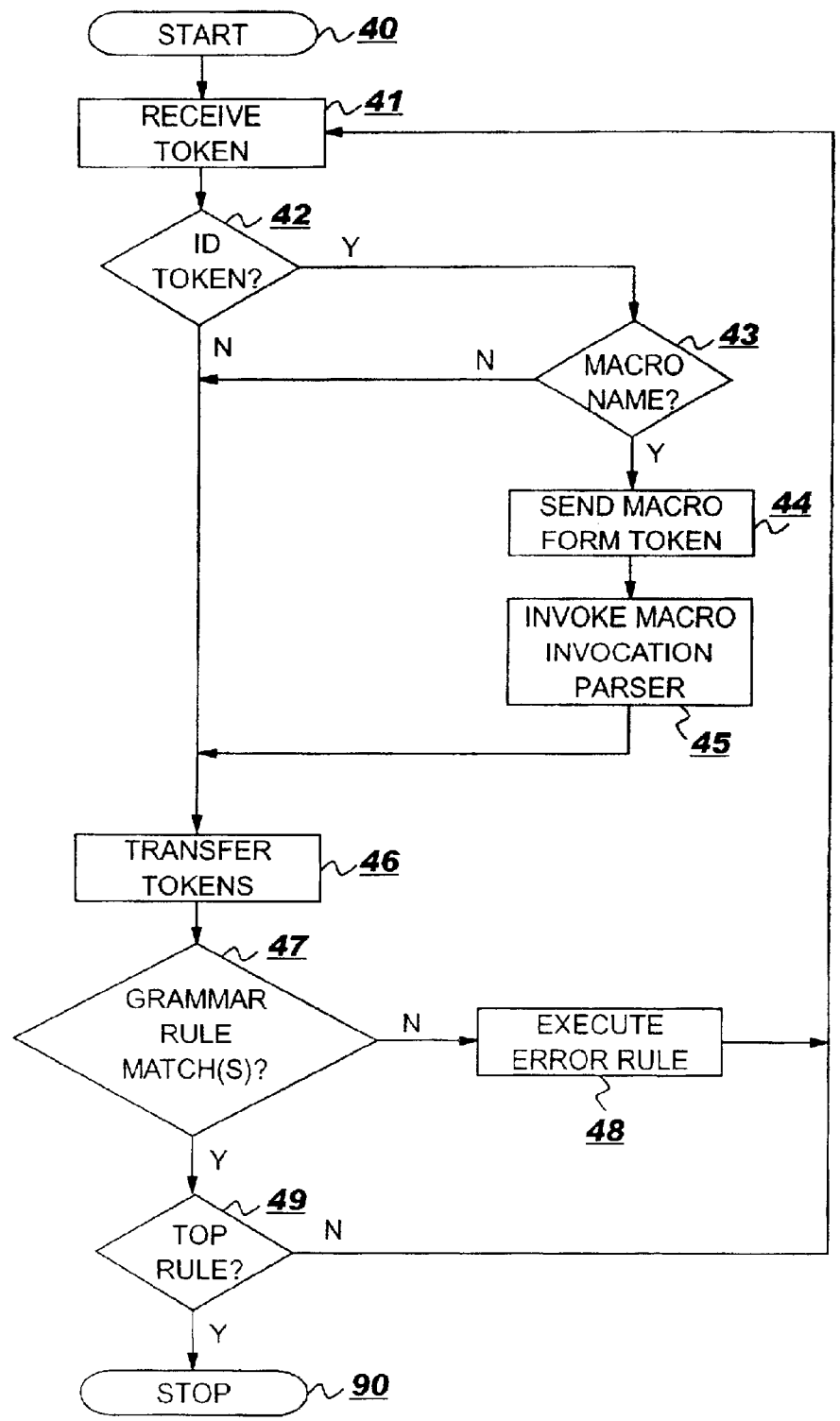
FIG. 4 is a high-level logic flow diagram of a method for processing macros of varying grammatical invocation by a pre-processor, in accordance with a preferred embodiment of the present invention.

With reference now to FIG. 4, there is depicted a high-level logic flow diagram of a method for processing macros of varying grammatical invocation by a pre-processor, in accordance with a preferred embodiment of the present invention. Starting at block 40, a token is received from source code by a lexer, as shown in block 41. A determination is made by the lexer as to whether or not the token is an identifier token, as depicted in block 42. If the token is an identifier token, another determination is made by the lexer as to whether or not the identifier token is a macro name, as shown in block 43. If the identifier token is a macro name, then the lexer sends a corresponding macro form token (instead of the identifier token) to a glue routine, as depicted in block 44.

After recognizing the macro form token, the glue routine invokes a macro invocation parser, as shown in block 45. Then, tokens are continuously transferred from the lexer to the macro invocation parser via the glue routine until a completion of the macro, as depicted in block 46.

Afterwards, a determination is made by the macro invocation parser as to whether or not a grammar rule is matched, as shown in block 47. If a grammar rule is not matched, an error rule is executed, as depicted in block 48. If a grammar rule is matched, another determination is made as to whether the top grammar rule is met, as shown in block 49. If the top grammar rule is not met, the process returns back to block 41 for a new token. Otherwise, if the top grammar rule is met, the macro invocation cycle is complete, as depicted in block 90.

The macro definition can be placed in the symbol table by storing the four parts of the macro definition (as mentioned previously) in a symbol table entry data structure. The symbol table entry contains, and is indexed by, a macro name. Also stored in the symbol table entry is the macro body definition, argument list or indication of an empty argument list and, critically, the proper macro form token.

A standard assembler can be modified to perform the present invention by:
1. including a glue routine to invoke a macro invocation parser when an identifier token being received from the source code is a macro form token that indicates a macro invocation;
2. modifying a symbol table to store both the basic macro definition and the macro form; and
3. modifying a lexer to look up identifiers in the symbol table and to return the proper macro form token.

By doing so, the present invention allows a parser and lexer to be combined for two distinctly different programming languages. As a result, sophisticated high-level pre-processor functions can be embedded in an assembler. Furthermore, a pre-processor can mimic the multiple forms in the underlying language (i.e., assembly language) very closely. Since the assembler and the pre-processor can be run simultaneously and interactively, a significant code reduction can be achieved because the pre-processor and the underlying language can share many common parameters (e.g., expressions are almost always common).

An assembler of the present invention may be executed in a variety of data processing systems under a number of different operating systems. The computer may be, for example, a personal computer, a midrange computer or a mainframe computer. In addition, the computer may be a stand-alone system or part of a network such as a local-area network (LAN) or a wide-area network (WAN).

Figure 5:
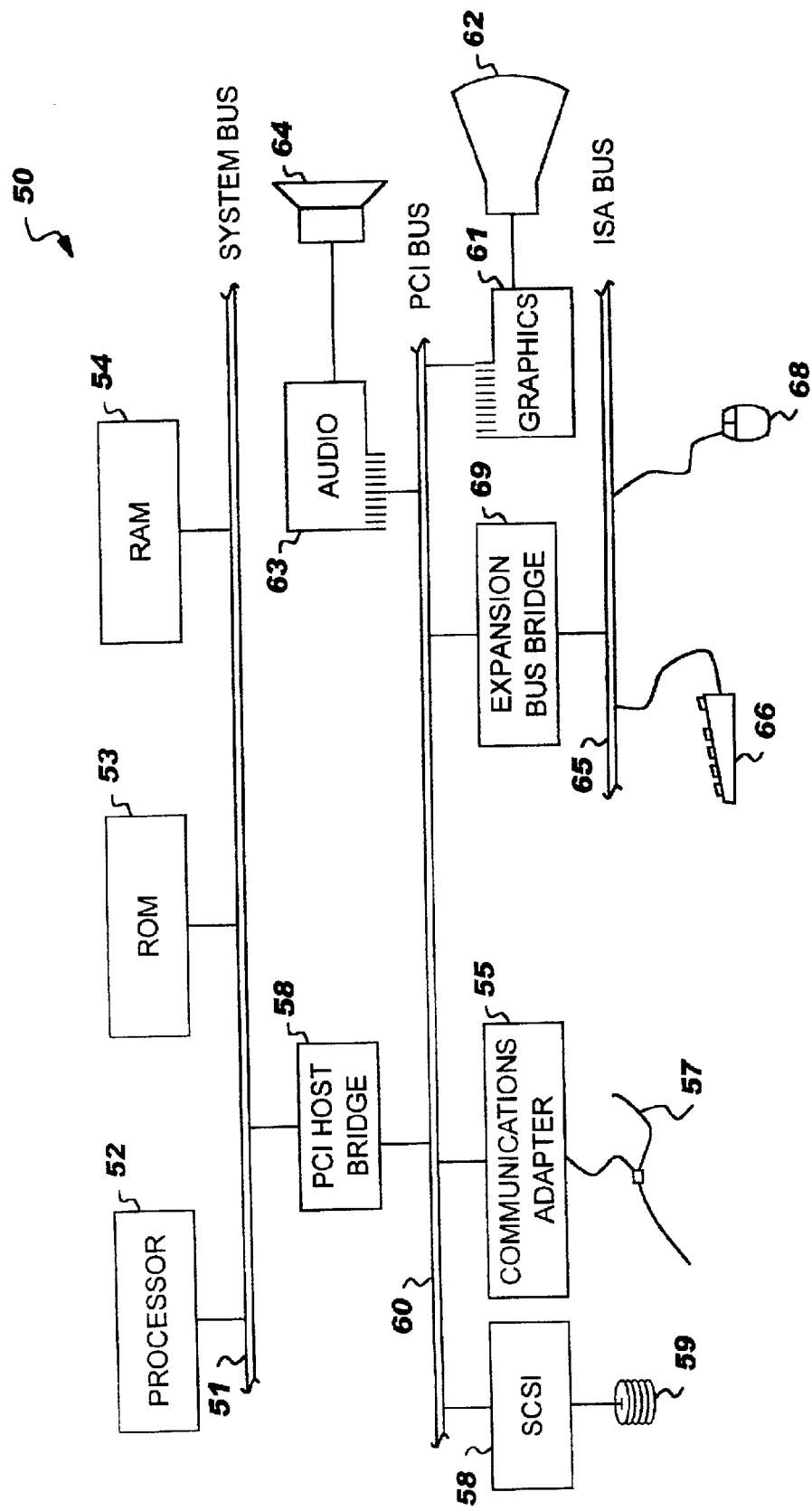
FIG. 5 is a block diagram of a computer system in which a preferred embodiment of the present invention can be applied.

Referring now to FIG. 5, there is depicted a block diagram of a computer system 50 in which a preferred embodiment of the present invention is applicable. As shown, a processor 52, a read-only memory (ROM) 53, and a random access memory (RAM) 54 are connected to a system bus 51. Processor 52, ROM 53, and RAM 54 are also coupled to a peripheral component interconnect (PCI) bus 60 of computer system 50 through a PCI host bridge 56. PCI host bridge 56 provides a low latency path through which processor 52 may directly access PCI devices mapped anywhere within bus memory and/or I/O address spaces. PCI host bridge 56 also provides a high bandwidth path allowing PCI devices to directly access RAM 54.

In addition, an audio adapter 63 and a graphics adapter 61 may be attached to PCI bus 60. Graphics adapter 61 controls visual output through a video monitor 62 and audio adapter 63 controls audio output through a speaker 64. Also attached to PCI bus 60 is a communications adapter 55 and a small computer system interface (SCSI) 58. Communications adapter 55 connects computer system 50 to a local-area network (LAN) 57. SCSI 58 is utilized to control a high-speed SCSI disk drive 59. Expansion bus bridge 69, such as a PCI-to-ISA bus bridge, may be utilized for coupling an industry standard architecture (ISA) bus 65 to PCI bus 60. As shown, a keyboard 66 and a mouse 68 are attached to ISA bus 65 for performing certain basic I/O functions.

As has been described, the present invention provides an embedded pre-processor with dynamic macro forms. The present invention provides a solution to the critical problem of requiring foreknowledge of a macro's form. With the present invention, a standard parser does not have to process a macro invocation, thereby separating the macro invocation process from the basic assembler grammar.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for processing macros of varying grammatical invocation by a pre-processor having a lexer, a glue routine, a macro invocation parser and a parser, said method comprising:
   receiving an identifier token from source code;
   in response to said received identifier token matching a macro stored in a symbol table:
      replacing said identifier token with a corresponding macro form token;
      sending said macro form token to said glue routine;
      invoking said macro invocation parser by said glue routine;
      continuously receiving tokens by said macros invocation parser via said glue routine until a completion of said macro invocation; and
      sending a macro body definition of said macro to said lexer by said macro invocation parser.

2. The method of claim 1, wherein said receiving step is performed by a lexer.

3. The method of claim 1, wherein said replacing step is performed by a lexer.

4. The method of claim 1, wherein said sending step is performed by a lexer.

5. The method of claim 1, wherein said transferring step further includes transferring tokens from a lexer to said macro invocation parser.

6. A computer program product residing on a computer usable medium for processing macros of varying grammatical invocation by a pre-processor having a lexer, a glue routine, a macro invocation parser and a parser, said computer program product comprising:

program code means for receiving an identifier token from source code;

in response to said received identifier token matching a macro stored in a symbol table:

program code means for replacing said identifier token with a corresponding macro form token;

program code means for sending said macro form token to said glue routine;

program code means for invoking said macro invocation parser by said glue routine;

program code means for continuously receiving tokens by said macro invocation parser via said glue routine until a completion of said macro invocation; and program code means for sending a macro body definition of said macro to said lexer by said macro invocation parser.

7. The computer program product of claim 6, wherein said program code means for receiving is a lexer.

8. The computer program product of claim 6, wherein said program code means for replacing is a lexer.

9. The computer program product of claim 6, wherein said program code means for sending is a lexer.

10. The computer program product of claim 6, wherein said program code means for transferring further includes computer code means for transferring tokens from a lexer to said macro invocation parser.

* * * * *